(12) United States Patent
Maier-Laxhuber et al.

(10) Patent No.: US 6,378,326 B2
(45) Date of Patent: Apr. 30, 2002

(54) SORPTION COOLER

(75) Inventors: Peter Maier-Laxhuber, Dietersheim; Andreas Becky, Ottobrunn; Gert Richter, Uterschlelssheim/Riedmoos; Reiner Worz, Reichertshausen; Manfred Binnen, Dachau; Leo Totschnig, Munich; Ralf Schmidt, Freising; Jannik Inselkammer, Ottobrunn; Martin Leibhard, Emmering; Maximilian Ammon, Spait; Axel Rosler, Nuremberg, all of (DE)

(73) Assignee: Zeo-Tech Zeolith-Technologie, GmbH, Unterschleissheim (DE)

( * ) Notice: Subject to any disclaimer, the term of this patent is extended or adjusted under 35 U.S.C. 154(b) by 0 days.

(21) Appl. No.: 09/823,054

(22) Filed: Mar. 30, 2001

(30) Foreign Application Priority Data

Apr. 3, 2000 (DE) .......................... 100 16 352

(51) Int. Cl.⁷ .............................. F25B 17/08
(52) U.S. Cl. ...................... 62/480; 62/457.9; 62/476
(58) Field of Search .............. 62/457.9, 479, 62/480, 477, 476; 165/109.12

(56) References Cited

U.S. PATENT DOCUMENTS

| 2,871,674 | A | * | 2/1959 | Koivisto et al. ............. 62/232 |
| 4,752,310 | A | | 6/1988 | Maier-Laxhuber et al. |
| 5,038,581 | A | | 8/1991 | Maier-Laxhuber et al. |
| 5,404,728 | A | | 4/1995 | Maier-Laxhuber |
| 5,440,896 | A | | 8/1995 | Maier-Laxhuber et al. |
| 5,518,069 | A | | 5/1996 | Maier-Laxhuber et al. |
| 5,813,248 | A | * | 9/1998 | Zornes et al. ................ 62/480 |
| 5,816,069 | A | | 10/1998 | Ebbeson |

\* cited by examiner

*Primary Examiner*—Henry Bennett
*Assistant Examiner*—Melvin Jones
(74) *Attorney, Agent, or Firm*—Hoffmann & Baron, LLP

(57) ABSTRACT

A sorption cooler for cooling substances in a vessel (4) by means of a sorption agent (11) within a sorption agent vessel (10), which in connected via a vapor valve (9) to an evaporator (10) for generation of working agent vapor, and where a part of the outer wall (1) of the vessel (4) is in good thermal contact with a working agent storage material (2) and at least this part of the outer wall (1) of vessel (4) is at the same time a part of the boundary surface (5) of the evaporator (8).

10 Claims, 1 Drawing Sheet

SORPTION COOLER

FIELD OF THE INVENTION

The invention concerns a sorption cooler for cooling a container by means of a sorption device and a method for regeneration of the sorption agent in accordance with the generic term of claim 1.

BACKGROUND OF THE INVENTION

Sorption devices are devices in which a liquid or solid sorption agent adsorbs a second, higher boiling agent, the working agent, in vapor form with release of heat (sorption). The working agent is evaporated in an evaporator while taking up heat. After the sorption agent is saturated, it can be desorbed through the delivery of heat (regeneration). In doing so, the working agent is evaporated out of the sorption agent. The work agent vapor can be reliquefied and then reevaporated in the evaporator.

Sorption devices for cooling with solid sorption agents are known from EP 0 368 111 and DE-OS 34 25 419. Sorption agent vessels filled with sorption agents draw off the working agent vapor, which arises in an evaporator, and adsorb it in the sorption agent fill while releasing heat. The heat of adsorption in this case must be withdrawn from the sorption agent fill. The cooling devices can be used for cooling and keeping foods warm in thermally insulated boxes.

The sorption cooling system known from EP 9 368 111 consists of a portable cooling unit and a stationary charging station that can be separated from it. The cooling unit consists of a sorption vessel filled with a solid sorbent and an evaporator, which contains the liquid working agent and a heat exchanger embedded therein. The evaporator and sorption vessel are connected to each other via a closeable vapor pipe. Liquid media that are cooled to the desired temperature level through temperature-controlled opening and closing of the closing device flow through a heat exchanger embedded in the evaporator. After the sorption agent has become saturated with the working agent, it can be heated in the charging station. The working agent vapor that flows out is reliquefied in the evaporator. The heat of condensation is withdrawn through cooling water, which must flow through the embedded heat exchanger.

Because of the embedded heat exchanger and temperature regulation, the sorption cooling system is expensive to manufacture and is complicated in its practical use for the untrained layman.

OBJECTS AND SUMMARY OF THE INVENTION

The task of the invention is to show an operation that is simpler than the prior art and a low-cost device.

This task is solved by the characteristic traits of claims 1 and 10. The dependent claims show additional inventive devices.

Accordingly, a sorption device in accordance with the invention contains a sorption agent within a sorption agent vessel, a vapor valve and a liquid working agent distributed in a working agent storage material within an evaporator. A portion of the outer wall of the container is in good thermal contact with the working agent storage material and at least this part of the outer wall of the container is at the same time apart of the boundary surface s of the evaporator.

The working agent storage material contains, for example, nonwoven glass fiber or mineral fiber materials and is glued or stretched over a large area. In the case of cylindrical vessels it is, as a rule, sufficient to coat the outer side surface of the container. Coating of the more highly vaulted bottom and top elements is not necessary. The shape of the vessel does not have to be adjusted to the special requirements of sorption technology. The working agent is evaporated out of the working agent storage material and cools the contents of the vessel through the good contact with the vessel wall.

In accordance with the invention another part of the boundary surface of the evaporator has thermal contact with the environment. In this region the working agent vapor can condense and give up its heat of condensation to the environment or to an external cooling medium. This will always take place when the environment or the external cooling medium is colder than the contents of the vessel. The working medium then evaporates from the working medium storage material while absorbing heat and condenses while giving up heat to the environment. Through this effect, which is also known as a heat pipe, the contents of the vessel are constantly reduced to the environmental temperature. However, if the environment is warmer than the contents of the vessel, no heat can be transferred from outside to the inside, provided the boundary surface in contact with the environment is free of liquid working agent. In order to guarantee this, the boundary surface is inclined so that the condensate runs off and can drip back onto the working medium storage material. This heat pipe effect is always of particular advantage when the vessel contents are supposed to take on the lower temperature automatically through a decrease of the ambient temperature. If, for example, the sorption cooler is installed in a cooling chamber, the temperature of the vessel contents will fall to the lower level; conversely, if the outside temperature rises, for example due to solar radiation, the construction of the sorption cooler in accordance with the invention acts like an insulated vessel under a vacuum. In doing so, the rise of the vessel temperature progresses a great deal more slowly than the decrease does.

Even during the regeneration phase, in which the sorption agent is desorbed from the working agent, the working agent vapor can condense on the boundary surface of the evaporator that is in contact with the environment. This always occurs when the boundary surface is colder than the vessel contents.

It is also advantageous if another wall region of the evaporator is at the same time a component of the sorption agent vessel. Weight and costs can be saved through the consolidation of the intermediate walls that is then possible. This is particularly true when the vapor valve is arranged in a common wall. Additional flow channels and connecting elements can then be spared.

Particularly compact and stable embodiments of the idea in accordance with the invention are achieved when the sorption cooler has a shell-like structure. In this case, a cylindrical evaporation jacket is arranged around the cylindrical vessel and around this jacket in turn is the cylindrical sorption vessel, which uses the evaporation jacket simultaneously as its inside wall. In order to reduce the thermal contact between the sorption agent and the evaporator, thermal insulation agents can be arranged within the sorption agent vessel.

However, this additional insulation can be avoided if the working agent vapor pressure is especially low. In the case of low vapor pressures the conductive and convective fractions of heat transfer are reduced. If the zeolite/water pair is used, the achievable insulation effect lies in the range of simple vacuum insulation. The radiant fraction that is still relevant in this case can be further reduced by building in radiation shields. It is particularly advantageous if the common intermediate wall between evaporator and the sorption agent vessel acts as a radiation shield.

During the regeneration phase the sorption agent is heated and the working agent vapor is desorbed. The vapor flows through the vapor valve to the evaporator and condenses out there. At the end of the regeneration, the input of heat to the sorption agent is interrupted. The desorption of additional working agent vapor ends with this. The vapor valve is closed. The desorbed working agent is in liquid state in the working agent-storage material. The sorption agent is cooled afterwards to the ambient temperature by the release of heat through the outer wall of the sorption agent vessel.

To initiate the cooling phase, the vapor valve is opened. The working agent vapor can now flow from the evaporator into the sorption agent vessel and be exothermically sorbed by the sorption agent. The evaporating working agent is cooled in the evaporator and cools the vessel together with its contents. In order to produce the maximum cooling power, the sorption agent must be able to give up its heat of sorption. A particularly intensive cooling effect is achieved if the sorption agent vessel has a sufficiently large surface for heat exchange to the air that surrounds it. Advantageously, the vessel wall should be cooled to temperatures under 50° C. Then sufficiently low temperatures are possible in the evaporator.

If the vessel contains liquids, only the liquid volume that is around and below the working agent-storage material has to be cooled. The volume that is higher up remains near the starting temperature because of the lower density and low thermal conduction of the liquids. By appropriate positioning and arrangement of the evaporator the liquid volume to be cooled can be selected beforehand. In practice one achieves in this way a faster cooling of the liquid at the bottom, which is then withdrawn first. The liquid at the top is not cooled until it falls into the region of the evaporator through the removal of the chilled amount of liquid.

Before refilling a vessel, it is usually cleaned. For this, cleaning and rinse washing liquids are introduced into the vessel and as a rule removed by tipping the vessel. For this reason the evaporator is designed so that the vessel can empty in all cleaning processes without any problems and without traces of rinse agent.

The use of the sorption agent pair zeolite/water is particularly advantageous. Zeolite is a crystalline mineral that consists of a regular framework structure of silicon and aluminum oxides. This framework structure contains voids in which water molecules can be sorbed while releasing heat. Within the framework structure the water molecules are subject to strong field forces that liquefy the molecules in the lattice and bind them in a liquid-like phase. The strength of the binding forces acting on the water molecules is dependent on the amount of water already contained in the framework structure and the temperature of the zeolite. For practical use up to 25 grams of water can be sorbed per 100 grams of zeolite. The amount of cold that can be generated in the evaporation here is sufficient to cool about 1 liter of water by about 14 kelvin. Zeolites are solid substances without problematic heat expansion in the sorption or desorption reaction. The framework structure is freely accessible to water vapor molecules on all sides. The devices are thus capable of use in any position.

The use of water as working agent allows the costs required for control to be reduced to a minimum. In the evaporation of water under a vacuum the water surface cools to 0° C. and freezes to ice with continuous evaporation. This ice layer rapidly grows until the resulting pressure drop through the ice layer reduces the growth. The ice layer can be used advantageously to control the liquid temperature. With low delivery of heat from the vessel the ice layer grows, while with much higher delivery it melts. Through the natural ice formation the heat transfer from the liquid into the evaporator is reduced so that the liquid does not cool under 0° C. and as a rule remains at 4 to 5° C.

It is also possible to add substances that lower the freezing point to the aqueous working agent if the outlet temperature of the liquid is to be reduced to below 4° C.

However, it is also possible to use other sorption agent pairs with which the sorption agent is solid and remains solid even during the sorption reaction. Solid sorption agents have low thermal conduction and poor heat transfer. Since even the heat transfer from gaseous media (air, waste gases) to the sorption agent vessel lies in the same order of magnitude, in principle heat exchangers without fins are recommended, for example cylindrical or tube geometries.

Some solid sorption agents like zeolites are stable enough even to compensate external excess pressures on thin-walled vessel walls. Additional stiffening or thick-walled heat exchanger surfaces are for this reason not necessary. Since the sorption apparatus is under a vacuum when water is used as the working agent and no gases should get into the system for the entire life span of the system, vacuum tight components are to be preferred for the vapor valve. For manual operation feed-through devices that are sealed by means of metal bellows have proven themselves.

In accordance with the invention the vapor valve is operated by a lever device, one end of which is linked to the evaporator or sorption vessel outer wall and the other end of which operates the valve. By deforming the outer wall at the point of the first lever end the valve device can be operated in accordance with the invention without expensive vacuum feed-through devices.

Sorption agent temperatures from 250 to 350° C. in regeneration and 40 to 80° C. in sorption are recommended for an economical mode of operation. Since zeolite granulates in particular have low thermal conduction, the sorption vessel should be designed so that the heat conduction path for the converted amounts of heat does not exceed 18 mm. All of the known devices that achieve the necessary temperature level and do not unnecessarily heat the contents of the vessel are suitable as heat sources for regeneration. Electrically heated plates or jackets that are matched to the geometry of the sorption agent vessel are advantageous. The heating can be arranged on a palette, for example for several sorption coolers, in order to make use of production-related wait times after filling the vessels for regeneration. Also advantageous are heating devices that heat the sorption agent fill via radiant or inductive heat (eddy currents). Of course, it is also possible to connect the heating device permlanently to the sorption vessel and even to leave it there in the transportation of mobile sorption coolers.

Regeneration in a hot air oven at an air temperature over 300° C. is particularly advantageous. If the zeolite fill is arranged in a thin layer on the inner side of the outer jacket, the regeneration can be completed within an hour. In regeneration in a hot air oven, the vacuum insulation protects the liquid against undesired heating.

During the cooling phase, the surface of the sorption agent vessel can heat up to temperatures over 100° C. For this case suitable measures to protect against combustion are to be provided. Surface coatings of paper and fiber materials that protect against burning even at higher temperatures have proven themselves. If these coatings are wetted, a greater cooling power on the vessel is simultaneously possible through the evaporative cooling that occurs at the same time.

Narrow-mesh surface protective nets that prevent contact with the hot sorption vessel wall are also advantageous. Protective nets and plastic shrink films also optimally fit bulgy surface shapes and at the same time offer protection against mechanical damage.

No particular requirements are imposed on the size and geometry of the vessel. Thus all of the vessel that are conventional today for flowable contents (for example barrels, transport boxes, cans, open vessels, film sacks, multi-layer packagings, plastic vessels, canisters, hobbocks, bottles, pots, etc.) are suitable, provided they can be functionally connected to the sorption apparatus. High (tall) geometries with small diameters are preferred over flat shapes with large diameters, since the former enable faster cooling of the contents.

DETAILED DESCRIPTION OF THE PREFERRED EMBODIMENTS

Figure 1:
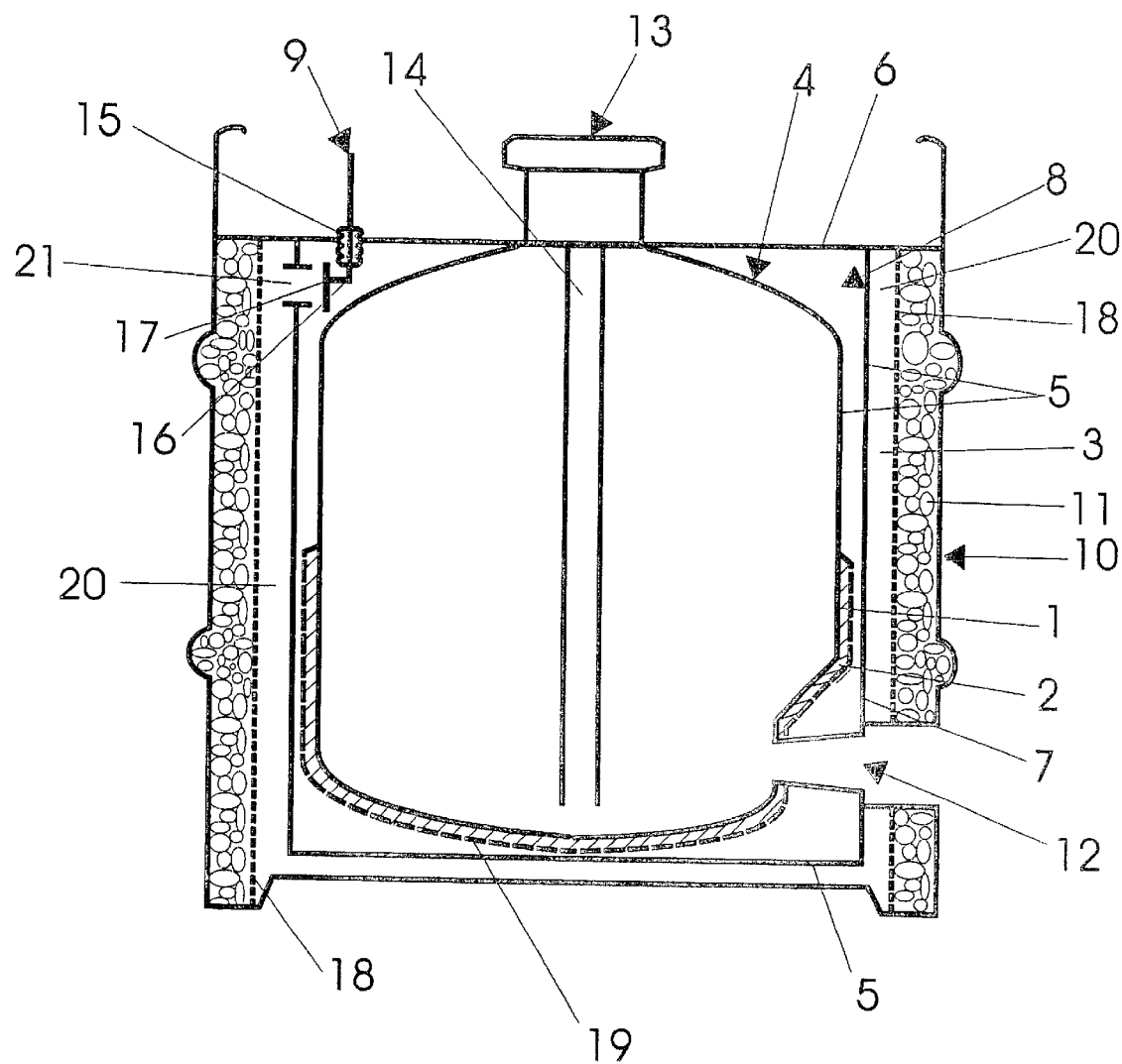
FIG. 1 is a cross-sectional view of the sorption cooler in accordance with the invention in the embodiment of a beverage vessel.

In the bottom drain of the cylindrical vessel 4 is a tap hole 12 via which the liquid vessel contents can be withdrawn in cooled form. In the upper region, the vessel 4 has a fitting 13 with a riser tube 14 reaching the bottom of the vessel. The beverage vessel is cleaned and filled via these two pieces by conventional methods, without the sorption technology needing special consideration. The evaporator 8 surrounds the complete vessel 4 except for the region of fitting 13. The closed cylindrical evaporation space is formed by parts of the outer wall 1 of vessel 4 and the boundary surface 5 and a part of the outer jacket 6 of the sorption cooler and another wall region 7. Through this construction the sorption cooler becomes compact, cheap and light. The wall region 7 is at the same time a component of a likewise cylinder sorption agent vessel 10. At the same time it also functions as a radiant barrier between the sorption agent 11 and vessel 4.

A working agent storage material 2 is fixed on the lower outer wall 1 of vessel 4 by means of a metal lattice 19. The working agent storage material 2 consists of an absorbent glass fiber mat which uniformly distributes the working agent water in the region of the outer wall 1 of vessel 4 through its hygroscopic action.

The sorption agent 11 is fixed in jacket form on the inside of the outer jacket of the sorption agent vessel 10 through a cylindrical perforated lattice 18. Between this lattice and the wall region 7 is an annular gap 20, which extends over the bottom region and at the same time functions as a vacuum insulation and vapor distributor.

A vapor valve 9 sits in an opening in the sorption agent vessel 10. It contains a metal bellows 15, via which a linkage 16 that can be operated from outside can open and close a valve head 17. Linkage 16 is adjusted so that if metal bellows 15 is not deflected, the valve head 17 is pressed against the opening. A backflow of water vapor from evaporator 8 into the sorption agent vessel 10 is suppressed until the metal bellows 15 is deflected and valve head 17 is lifted. During the regeneration phase, in which water vapor flows back into evaporator 8, the valve head 17 automatically clears the way for the vapor flow.

In accordance with the invention, the sorption coolers are regenerated after refilling with beverages by heating the sorption agent. The water vapor desorbed upon heating flows through the open valve head 17 into evaporator 8 and condenses on the walls of vessel 4. The beverages take up the beat of condensation and are heated. The heating is approximately of the same magnitude as the last occurring cooling, thus as a rule about 20 to 25 kelvin.

Beer is bottled, for example, at relatively low temperatures of 4 to 5° C. The subsequent warming through the regeneration process is similar to the warming to ambient temperature that takes place in any case during storage.

To start the sorption process, linkage 16 is deflected and made fast. Water vapor flows from evaporator 8 to sorption agent 11. The beverages are cooled at the vessel wall 1, which is covered with the working agent storage material 2. The cooling rate for beverages is about 0.5 to 1 K/min, i.e., about 30 minutes after opening the valve head 17 the first glass at a temperature of about 5° C. can be tapped. Within another 2 hours the remaining contents can be removed in refrigerated state.

What is claimed is:

1. A sorption cooler for cooling substances in a vessel by means of a sorption agent within a sorption agent vessel, which is connected via a vapor valve to an evaporator for the generation of working agent vapor, wherein
a part of the outer wall of the vessel is in good thermal contact with a working agent storage material and at least this part of the outer wall of the vessel is at the same time part of the boundary surface of the evaporator.

2. A sorption cooler as defined in claim 1, wherein an additional part of the boundary surface of the evaporator is a part of the casing of the sorption cooler, and working agent vapor can condense on this part of the casing while releasing heat of condensation.

3. A sorption cooler as defined in claim 1, wherein an additional wall region of the evaporator is at the same time a component of the sorption agent vessel.

4. A sorption cooler as defined in claim 1, wherein both the evaporator and the sorption agent vessel are arranged in shell-like fashion around the vessel.

5. A sorption cooler as defined in claim 1, wherein a vacuum insulation is arranged between the vessel and the sorption agent vessel and this insulation contains the working agent vapor.

6. A sorption cooler as defined in claim 1, wherein a radiant shield is arranged between the sorption agent vessel and the vessel.

7. A sorption cooler as defined in claim 1, wherein the sorption agent contains a zeolite and the layer thickness on the inner side of the outer wall of the sorption agent vessel is less than 18 mm.

8. A sorption cooler as defined in claim 1, wherein the vapor valve is a non-return valve that lets the working agent vapor flow from sorption agent to the evaporator even with the valve setting closed.

9. A sorption cooler as defined in claim 1, wherein the outer wall of the sorption agent vessel is provided with a damping protection during the sorption phase.

10. A sorption cooler as defined in claim 1, wherein the outer walls of the sorption agent vessel are exposed to temperatures of 250 to 350° C. in a hot air oven and in doing so temperature-sensitive parts of the sorption cooler are covered in order to protect them against overheating.

* * * * *